United States Patent
Irie

(10) Patent No.: US 12,352,990 B2
(45) Date of Patent: Jul. 8, 2025

(54) OPTICAL FILTER AND IMAGE CAPTURING APPARATUS

(71) Applicant: CANON KABUSHIKI KAISHA, Tokyo (JP)

(72) Inventor: Yoshiaki Irie, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 505 days.

(21) Appl. No.: 17/898,645

(22) Filed: Aug. 30, 2022

(65) Prior Publication Data
US 2023/0076944 A1 Mar. 9, 2023

(30) Foreign Application Priority Data
Sep. 6, 2021 (JP) .................. 2021-144955

(51) Int. Cl.
| | |
|---|---|
| *G02B 5/26* | (2006.01) |
| *G02B 1/18* | (2015.01) |
| *G02B 5/20* | (2006.01) |
| *G02B 27/00* | (2006.01) |
| *G03B 11/00* | (2021.01) |
| *H04N 23/55* | (2023.01) |

(52) U.S. Cl.
CPC .............. *G02B 5/26* (2013.01); *G02B 1/18* (2015.01); *G02B 5/208* (2013.01); *G02B 27/0018* (2013.01); *G03B 11/00* (2013.01); *H04N 23/55* (2023.01)

(58) Field of Classification Search
None
See application file for complete search history.

(56) References Cited

U.S. PATENT DOCUMENTS

| | | | | |
|---|---|---|---|---|
| 2008/0285119 A1* | 11/2008 | Lyama | ............... | G02B 13/009 |
| | | | | 359/359 |
| 2009/0303590 A1* | 12/2009 | Irie | ............... | G02B 5/20 |
| | | | | 359/487.01 |
| 2015/0331163 A1* | 11/2015 | Iwasaki | ............... | G02B 5/26 |
| | | | | 359/359 |
| 2022/0342129 A1* | 10/2022 | Lee | ............... | G02B 5/28 |
| 2023/0384585 A1* | 11/2023 | Ma | ............... | G02B 27/0101 |

FOREIGN PATENT DOCUMENTS

JP  2013-130886 A  7/2013

\* cited by examiner

*Primary Examiner* — Ryan Crockett
(74) *Attorney, Agent, or Firm* — Cowan, Liebowitz & Latman, P.C.

(57) ABSTRACT

An optical filter comprises at least one optical member that transmits light, wherein a first optical film that reflects at least one of light in a longer wavelength band than a first wavelength and light in a shorter wavelength band than a second wavelength is formed on a first surface, and a second optical film that reflects at least one of light in a longer wavelength band than a third wavelength and light in a shorter wavelength band than a fourth wavelength is formed on a second surface, the second surface being different from the first surface, and the first wavelength and the third wavelength are different from each other by a first predetermined amount, and the second wavelength and the fourth wavelength are different from each other by a second predetermined amount.

9 Claims, 16 Drawing Sheets

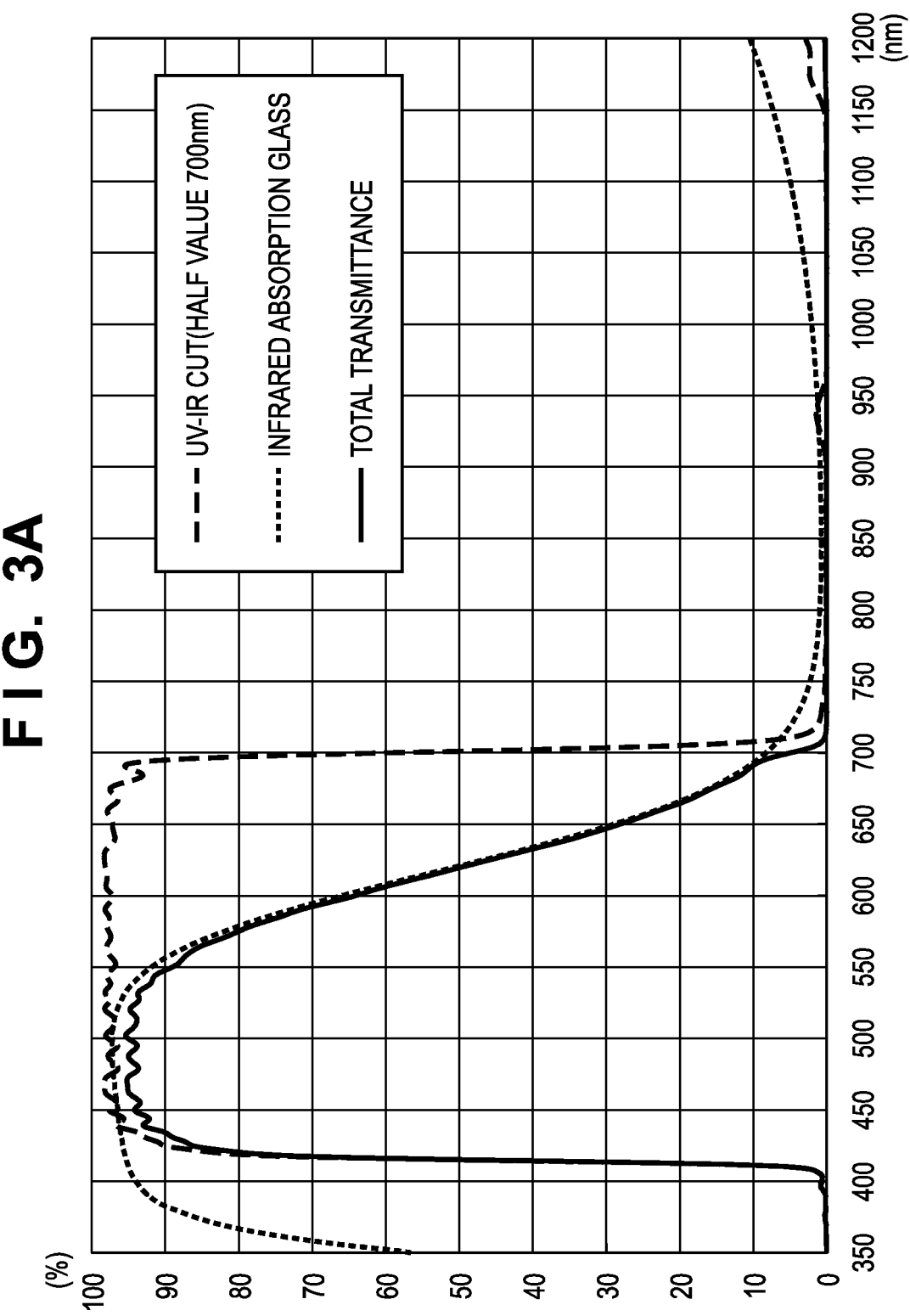

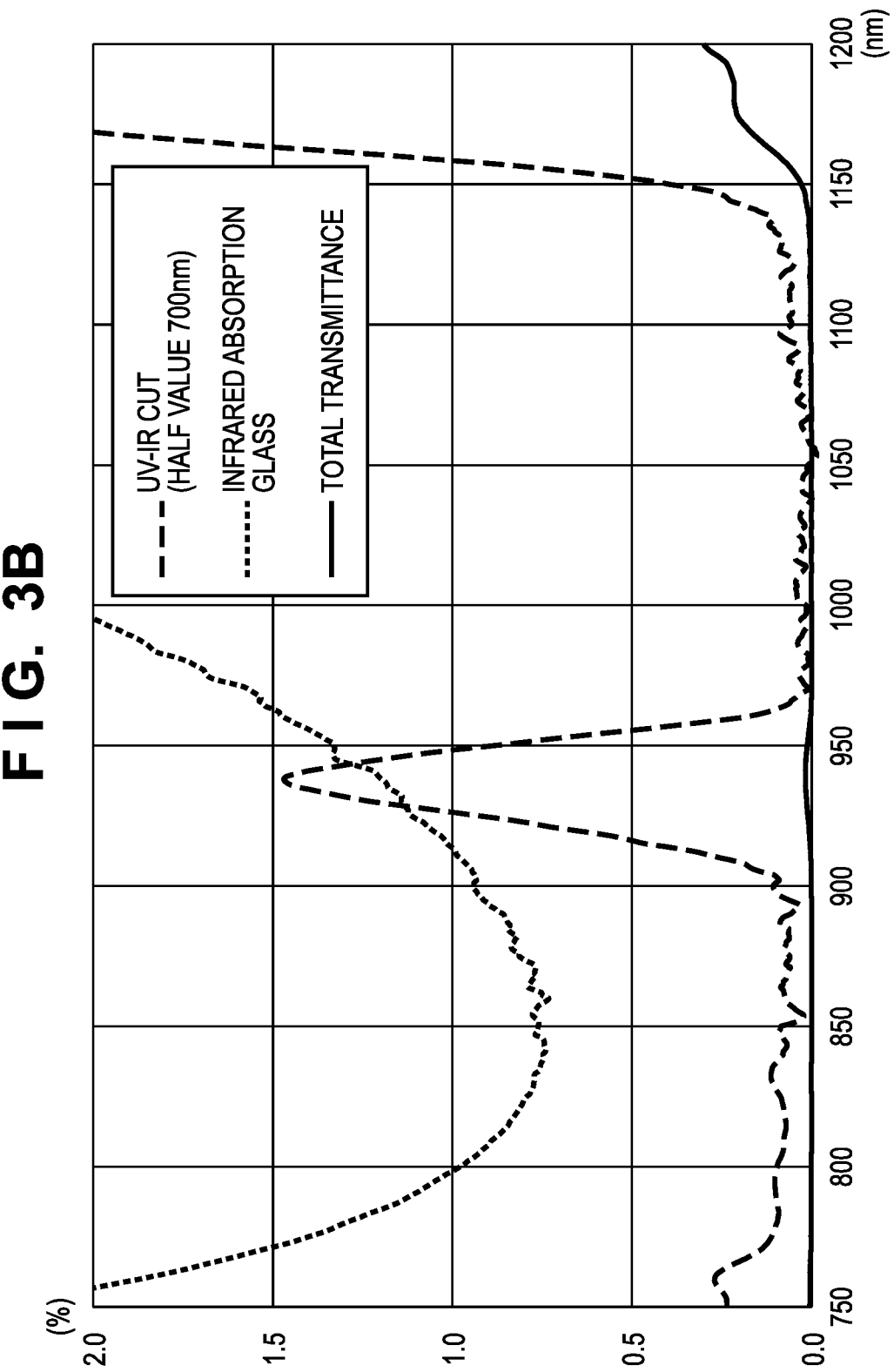

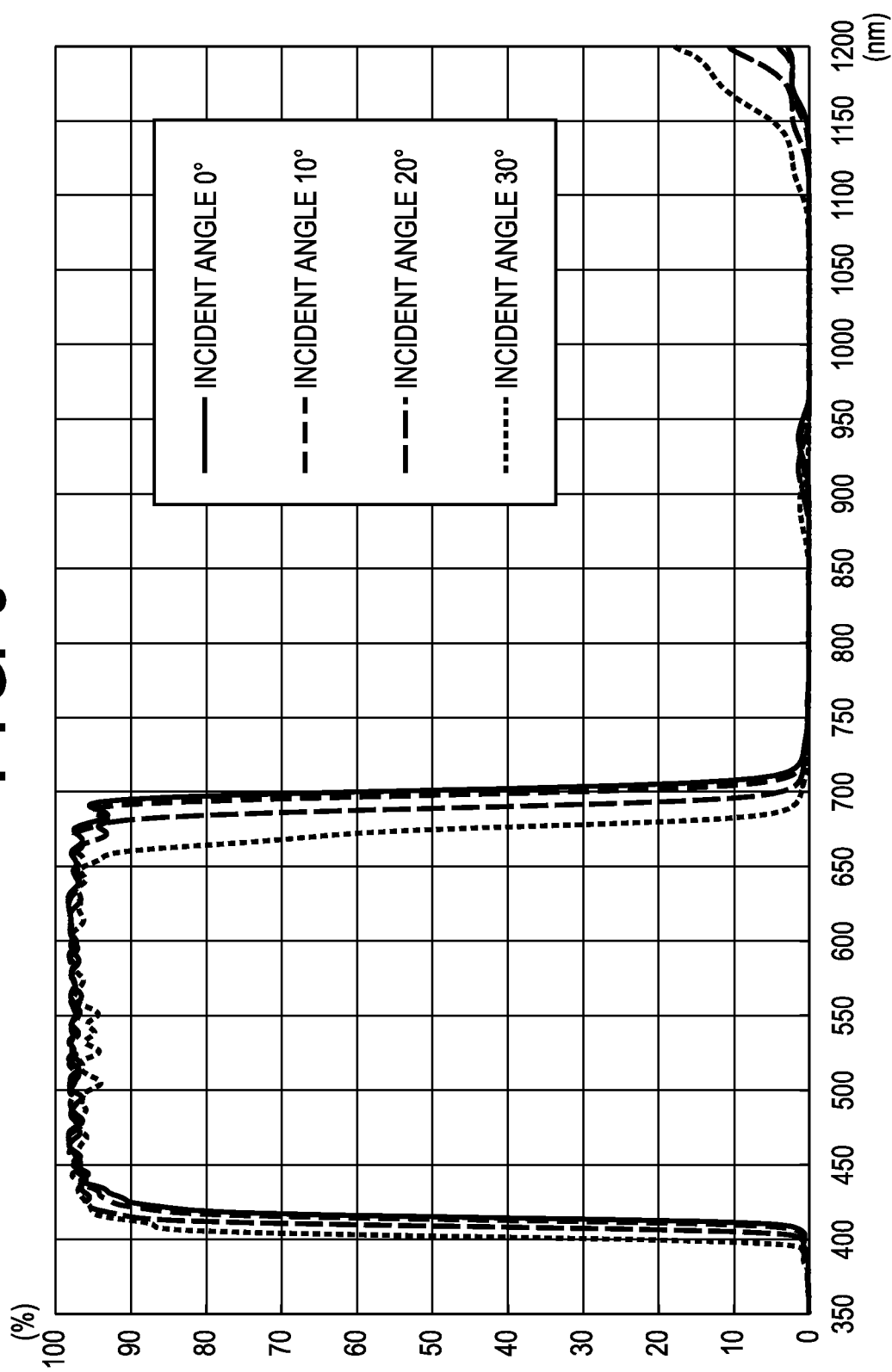

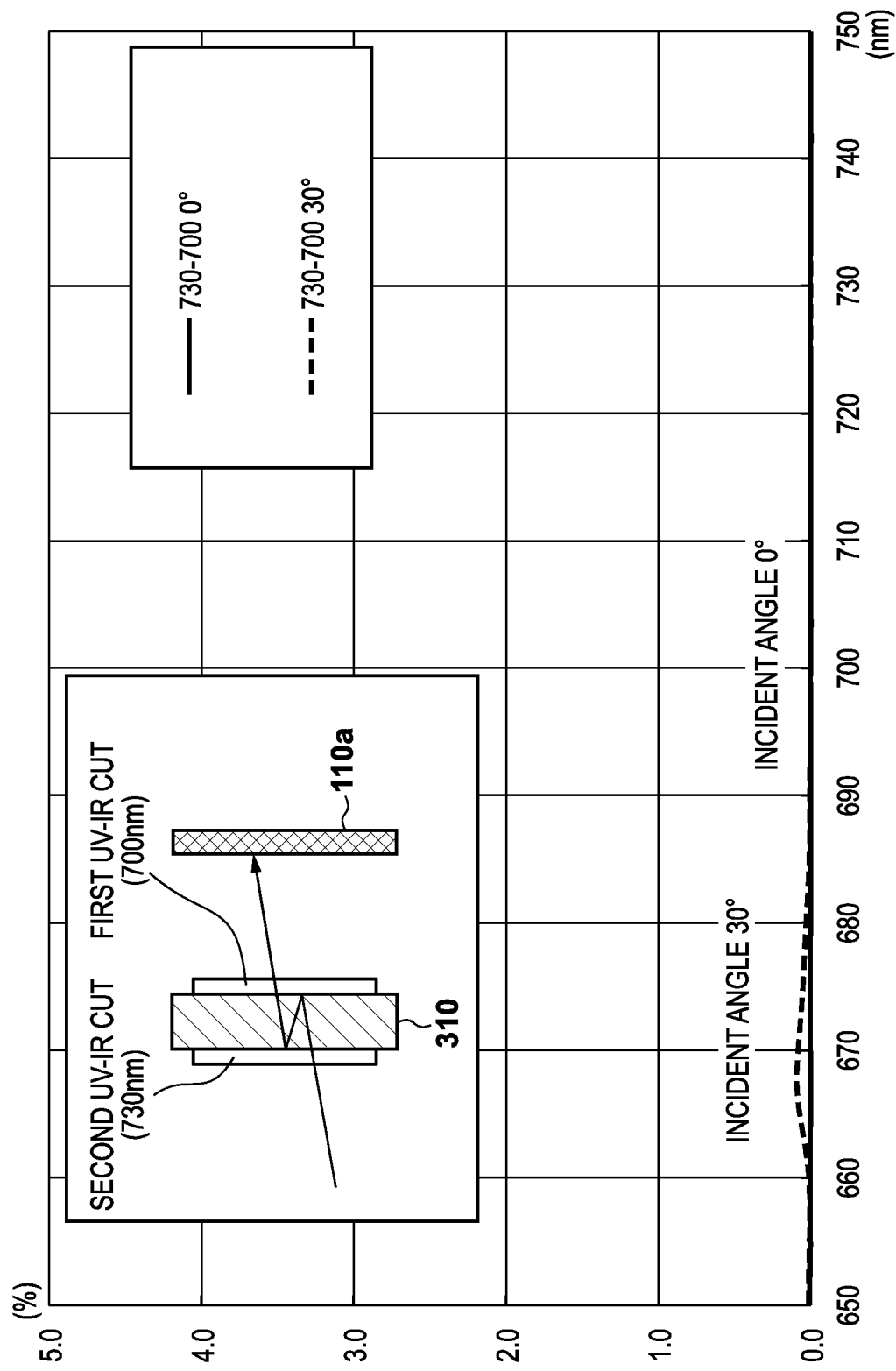

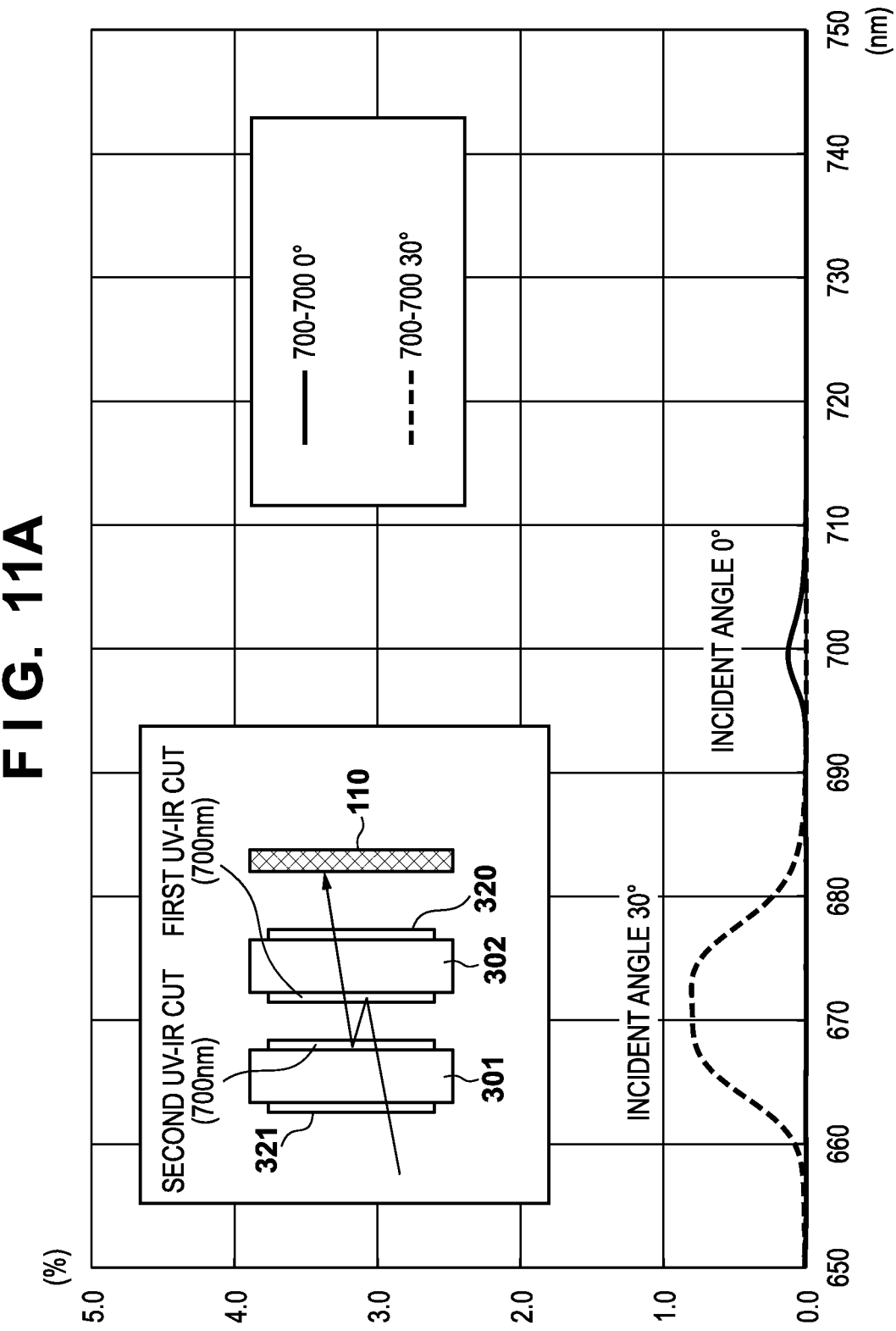

OPTICAL FILTER AND IMAGE CAPTURING APPARATUS

BACKGROUND OF THE INVENTION

Field of the Invention

The present invention relates to an optical filter arranged between an image sensor and an imaging lens.

Description of the Related Art

Conventionally, in an image capturing apparatus such as a digital camera, an optical filter having an optical low-pass function and an infrared absorption function is arranged in a front surface of an image sensor. An optical low-pass filter is an optical element for suppressing occurrence of false color due to a pseudo signal of a subject image captured with an image sensor of a CMOS type or the like, and generally, crystal having a birefringence effect is employed for the optical low-pass filter.

An infrared absorbing filter serves to approximate sensitivity of the image sensor to human luminosity. For the infrared absorbing filter, literally, phosphate based or fluorophosphate based glass that mainly transmits light having a visible wavelength of 400 nm to 700 nm, and absorbs more light in a longer-wavelength side (infrared range) than the visible wavelength is employed.

Furthermore, on the other hand, there is also known a filter in which luminosity is corrected by vapor-depositing, on a transparent white glass plate, a dielectric multilayer film, a so-called UV-IR blocking coat, that reflects light in a ultraviolet range of shorter wavelengths than a wavelength of near 400 nm, and light in an infrared range of longer wavelengths than a wavelength of near 700 nm, and thus blocks the light. Infrared absorption glass is relatively expensive, and thus, this type of filter is used in a low-cost camera and image pickup module.

However, generally, as described in Japanese Patent Laid-Open No. 2013-130886, an optical filter configuration in which luminosity is corrected by a hybrid method of a combination of infrared absorption glass and a UV-IR blocking coat is excellent in terms of color reproducibility of a captured image and ghost prevention performance. Thus, this type of filter has been mainly used for an optical filter for image capture.

Recently, in a digital camera, application in which an image is captured, emphasizing light having a particular wavelength is increasing. For instance, in an optical filter for image capture of a camera for capturing an infrared photograph, as a matter of course, infrared absorption glass or an IR blocking coat becomes unnecessary.

Furthermore, in an astrophotography field, there is merchandised a camera for astrophotography that can transmit more light having a wavelength of 656.3 nm that is referred to as an Hα line, to efficiently capture an image of a red diffuse nebula. In this type of camera for astrophotography, the most effective method for increasing a transmittance of the Hα line is to remove infrared absorption glass for luminosity correction from an optical filter for image capture arranged in a front surface of an image sensor.

As can also be seen in a graph of spectral transmittance characteristics shown in FIG. 3A, a transmittance of the Hα line (656.3 nm) can be increased about three times when an optical filter of a general camera in which infrared absorption glass is mounted is changed to a UV-IR blocking coat that blocks infrared rays of 700 nm.

Furthermore, on the other hand, a plurality of photosensors such as a photo-interrupter and a photo-reflector are employed for main mirror control, shutter drive control, and position detection of an operational member such as a focus lens and a zoom lens in an imaging lens of a camera. Those photosensors are configured as a set of an infrared light emitting diode and a photo-transistor, and the infrared light emitting diode emits invisible light having a wavelength of 850 nm to 950 nm.

In this context, as described above, when an optical filter of a camera for astrophotography is constituted only of a UV-IR blocking coat, capability of blocking infrared light lowers more than capability of a normal camera, due to the absence of infrared absorption glass. For instance, when high sensitivity and long exposure are set as image capture conditions of the camera, there is a possibility that infrared stray light slightly occurring with the photosensor described above be reflected as ghost or flare in a captured image.

Then, as a countermeasure for this issue, it is conceivable to add one surface of an IR blocking coat (also including a UV-IR blocking coat) that blocks infrared light in a longer-wavelength side from near 700 nm, to sufficiently transmit Hα line light and to thoroughly block infrared light. Accordingly, in the photosensor described above, infrared light is blocked by further adding an infrared reflection blocking coat to a normal UV-IR blocking coat of a camera for astrophotography to form two reflection surfaces, and by double-reflecting infrared band light.

However, when IR blocking coats having similar reflection blocking characteristics are formed on two surfaces, there has been an issue of occurrence of multiple reflection between the two vapor-deposited surfaces, and of occurrence of red ghost light near a bright spot such as a star image.

SUMMARY OF THE INVENTION

The present invention has been made in view of the above-described problem, and provides an optical filter with which in a case where an image is captured, emphasizing a particular wavelength light, a captured image having high quality can be obtained.

According to a first aspect of the present invention, there is provided an optical filter arrangeable in an optical path between an imaging lens and an image sensor, the optical filter comprising at least one optical member that transmits light, wherein a first optical film that reflects at least one of light in a longer wavelength band than a first wavelength and light in a shorter wavelength band than a second wavelength shorter than the first wavelength is formed on a first surface of the at least one optical member, and a second optical film that reflects at least one of light in a longer wavelength band than a third wavelength and light in a shorter wavelength band than a fourth wavelength shorter than the third wavelength is formed on a second surface of the at least one optical member, the second surface being different from the first surface, and the first wavelength and the third wavelength are different from each other by a first predetermined amount, and the second wavelength and the fourth wavelength are different from each other by a second predetermined amount.

According to a second aspect of the present invention, there is provided an image capturing apparatus comprising the optical filter described above and arranged in an optical path between an imaging lens and an image sensor.

Further features of the present invention will become apparent from the following description of exemplary embodiments with reference to the attached drawings.

BRIEF DESCRIPTION OF THE DRAWINGS

FIG. 3A is a figure showing a spectral transmittance of an optical filter.

FIG. 3B is an enlarged figure showing a spectral transmittance of an optical filter.

FIG. 8 is a figure showing angular dependency characteristics of a UV-IR blocking coat.

FIG. 9B is a figure showing spectral intensity of ghost light.

FIG. 11A is a figure showing spectral intensity of ghost light.

DESCRIPTION OF THE EMBODIMENTS

Figure 1:
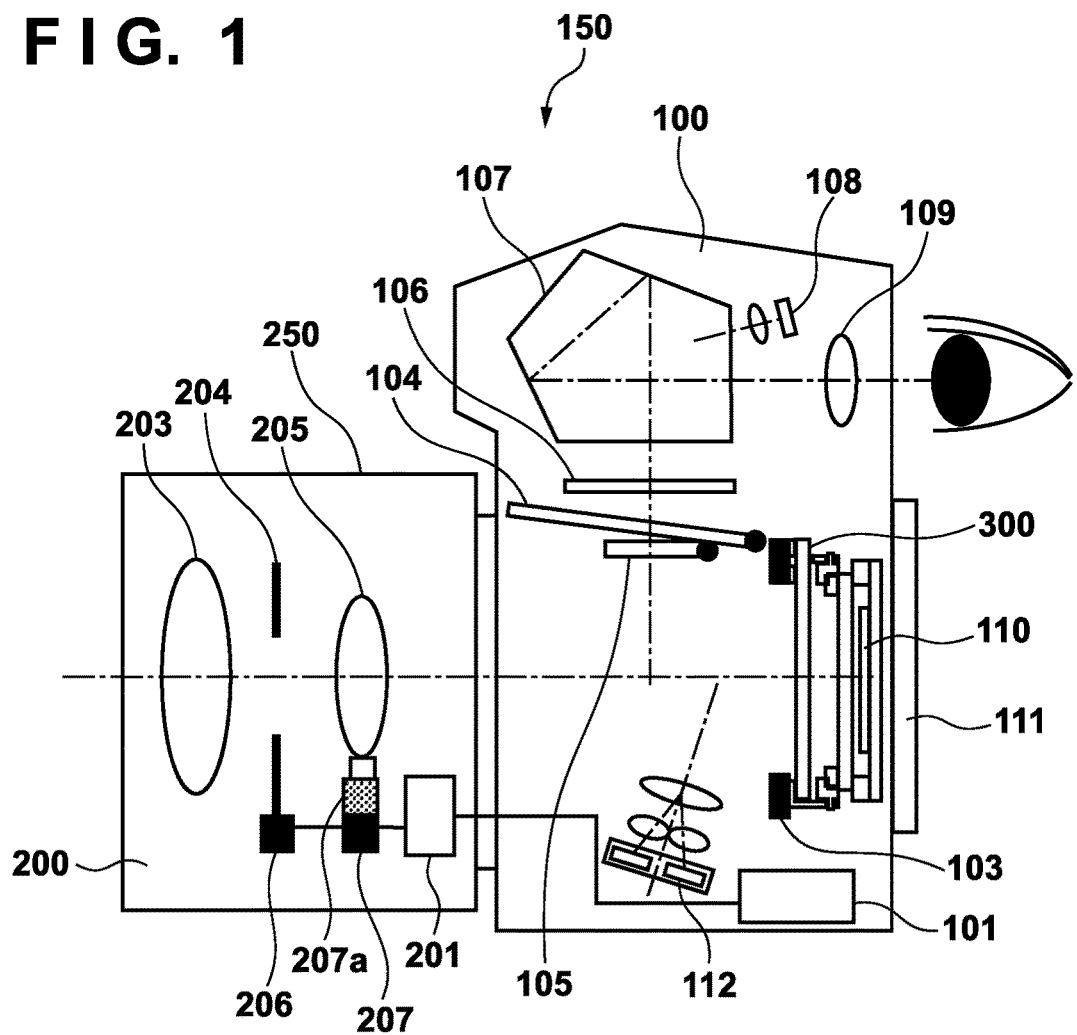
FIG. 1 is a schematic diagram of a configuration of a digital single lens reflex camera according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram of a configuration of a digital single lens reflex camera according to a first embodiment of the present invention. A digital single lens reflex camera (hereinafter, referred to as a camera) 150 is constituted of a camera body 100 and a lens unit 250 mounted in the camera body 100.

In FIG. 1, a central arithmetic processing unit (CPU) 101 of the camera body 100 controls overall operations of the camera 150.

An imaging lens 200 forms an image with light from a subject, on an image sensor 110. The imaging lens 200 is incorporated in the lens unit 250 that is detachably arranged to the camera body 100. A focal plane shutter 103 controls an amount of light from a subject that reaches the image sensor 110 via the imaging lens 200.

A semi-transmissive main mirror 104 transmits a portion of light from a subject that has passed through the imaging lens 200, and the portion of the light is reflected by a total reflection sub mirror 105, to be guided to a focus detection unit 112 for known phase difference focus detection. Accordingly, a so-called defocus amount can be detected, and the defocus amount indicates a deviation direction and an amount of deviation of focus of light from a subject with which an image is formed by the imaging lens 200, with respect to a light receiving surface of the image sensor 110.

A lens control unit 201 is provided in the lens unit 250, and controls the imaging lens 200. The CPU 101 on the camera body side transmits a driving pulse for driving the imaging lens 200 to the lens control unit 201, in consideration of sensitivity to lens driving (fineness of control intrinsic to a lens) of the imaging lens 200, based upon a defocus amount calculated by the focus detection unit 112. The lens control unit 201 drives a focus motor 207 in accordance with a pulse transmitted from the CPU 101, and drives a focus lens 205 in the imaging lens 200 to an in-focus position to perform automatic focus adjustment. On this occasion, a position of the focus lens 205 has been detected by a photosensor (photo-interrupter) 207a, and a target driving amount of the focus motor 207 is determined in consideration of sensitivity according to a current position of the focus lens 205.

Furthermore, during an image capture operation, the CPU 101 issues instruction to the lens control unit 201 to cause an aperture value of a diaphragm 204 of the imaging lens 200 to become a set aperture value. In accordance with the instruction, the lens control unit 201 drives a diaphragm driving actuator 206.

The camera body 100 further includes an eyepiece lens 109, a pentaprism 107 serving as an optical inversion unit for inverting an image, and a focusing plate 106 arranged at a position equivalent to a position of an image capture surface 110a on the image sensor 110 on which an image is formed by the imaging lens 200.

A photometric sensor 108 measures brightness of visible light from a subject. An optical filter 300 is arranged (is arrangeable) between the imaging lens 200 and the image sensor 110, and blocks an infrared wavelength component of a light beam guided to the image sensor 110 while attenuating a high-frequency component of the light beam.

As described in detail below, the optical filter 300 is constituted of a single birefringent crystal plate (optical member) 300a. Furthermore, the birefringent crystal plate 300a also includes a function to remove foreign particles (foreign substances) such as dust adhering to a surface, by vibration given from a device such as a piezoelectric element. An external display unit 111 is composed of TFT color liquid crystal for checking a captured image.

Note that in FIG. 1, the camera 150 is in an exposure state with light from a subject, in which the semi-transmissive main mirror 104 and the total reflection sub mirror 105 are retracted upward in the camera body 100 and the focal plane shutter 103 runs.

The optical filter 300 will be described in detail below.

Figure 2:
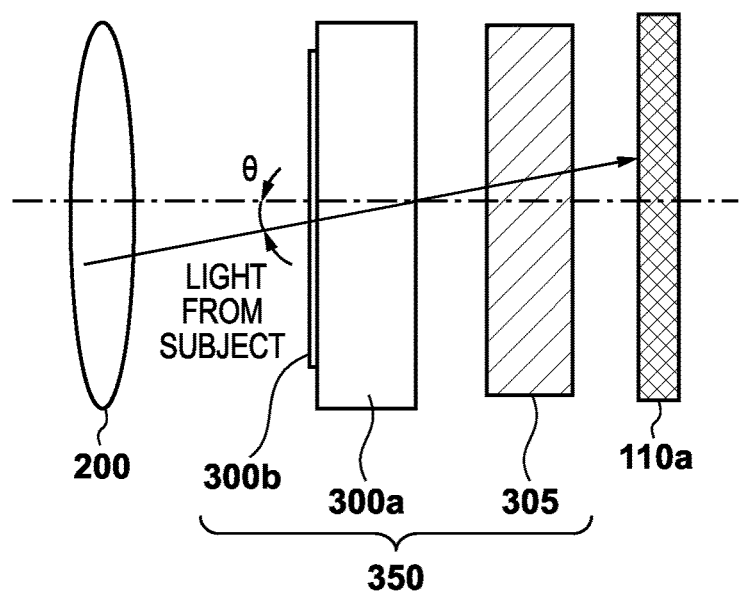
FIG. 2 is a figure illustrating a configuration of a conventional optical filter.

FIG. 2 is a schematic diagram of an optical filter of a normal digital camera.

The normal digital camera employs an optical low-pass filter to suppress occurrence of false color in a captured image. Here, an optical filter 350 includes a specification in which horizontal two-point separation is performed by a crystal plate 300a having 0° rotation angle birefringence. Furthermore, a UV-IR blocking coat 300b composed of a dielectric multilayer film is vapor-deposited on a surface of the crystal plate 300a that is the imaging lens 200 side, and the UV-IR blocking coat 300b reflects ultraviolet light and infrared light to block the light. Furthermore, phosphate based or fluorophosphate based infrared absorption glass 305 is arranged between the crystal plate 300a and an image capture surface 110a of an image sensor 110.

FIG. 3A shows spectral transmittance characteristics of the UV-IR blocking coat 300b and the infrared absorption glass 305. As shown in FIG. 3A, the UV-IR blocking coat 300b is a dielectric multilayer film having a longer-wavelength side cut wavelength (wavelength at the time of a longer-wavelength side transmittance of 50%) of 700 nm, and a shorter-wavelength side cut wavelength (wavelength at the time of a shorter-wavelength side transmittance of 50%) of 415 nm. The infrared absorption glass 305 has a red visible range cut wavelength of 620 nm. Then, a total transmittance that is a composite of transmittances of both the UV-IR blocking coat 300b and the infrared absorption glass 305 finally becomes spectral transmittance characteristics of the optical filter 350.

Figure 4:
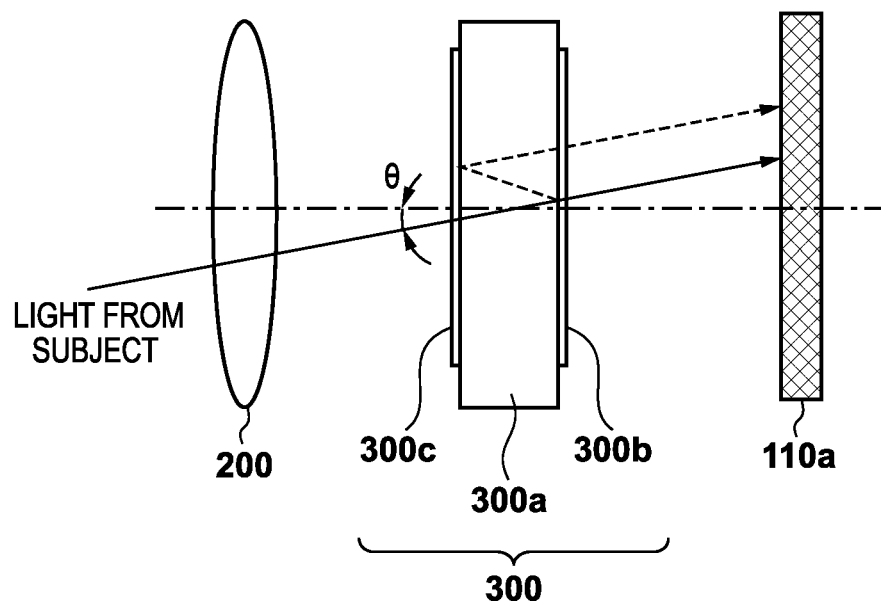
FIG. 4 is a figure illustrating a configuration of an optical filter according to the first embodiment of the present invention.

In contrast to this, FIG. 4 is a schematic view illustrating the optical filter 300 according to the first embodiment.

As with the normal camera, the optical filter 300 includes the crystal plate 300a having 0° rotation angle birefringence. A first UV-IR blocking coat 300b that is a first dielectric multilayer film is vapor-deposited on a back surface of the crystal plate 300a that is the image capture surface 110a side of the image sensor 110. Furthermore, a second UV-IR blocking coat 300c that is a second dielectric multilayer film is vapor-deposited on a surface of the crystal plate 300a that is the imaging lens 200 side.

Figure 5:
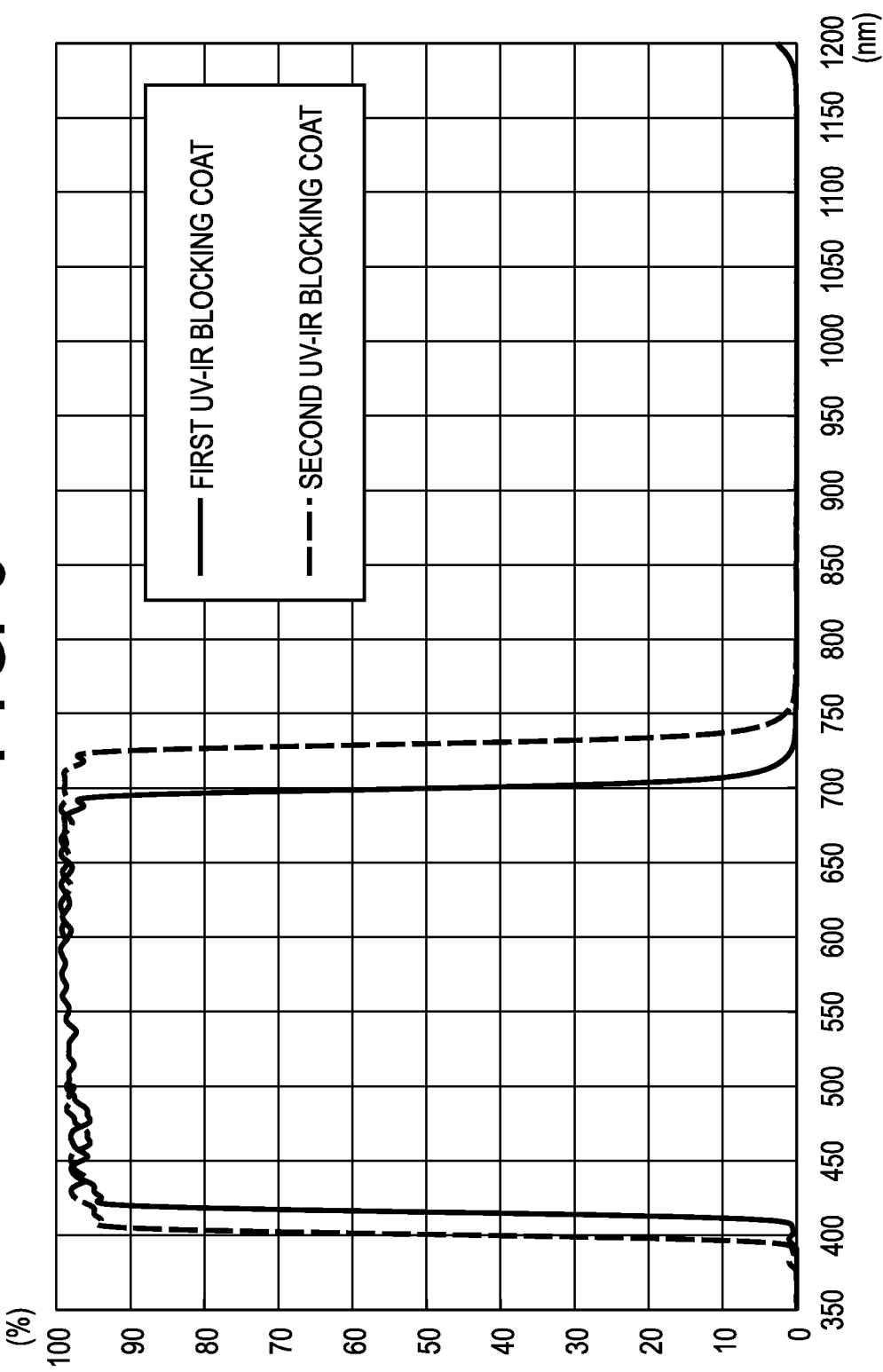
FIG. 5 is a figure showing a spectral transmittance of a UV-IR blocking coat.

FIG. 5 is a graph showing spectral transmittances of the first UV-IR blocking coat 300b and the second UV-IR blocking coat 300c.

The first UV-IR blocking coat 300b is a dielectric multilayer film (optical film) coat having spectral characteristics of a first longer-wavelength side (longer wavelength band) cut wavelength (wavelength at the time of a transmittance of 50%) of 700 nm, and a first shorter-wavelength side (shorter wavelength band) cut wavelength of 415 nm. Furthermore, the second UV-IR blocking coat 300c is a dielectric multilayer film coat (optical film) having spectral characteristics of a second longer-wavelength side (longer wavelength band) cut wavelength of 730 nm, and a second shorter-wavelength side (shorter wavelength band) cut wavelength of 400 nm.

The optical filter 300 according to the present embodiment includes a configuration in which a taken image of a red diffuse nebula that is a target of astrophotography image capture is emphasized. More specifically, the infrared absorption glass (reference sign 305 of FIG. 2) mounted in the optical filter of the normal camera is removed, to transmit the Hα line that is red light emitted from a hydrogen atom and that has a wavelength of 656.3 nm, at a transmittance close to 100%.

While FIG. 3A shows the graph of the spectral transmittance of the optical filter of the normal camera in which the infrared absorption glass 305 is mounted, FIG. 3B is an enlarged figure showing the graph of the wavelength range of 750 nm to 1200 nm of FIG. 3A. In this FIG. 3B, when the spectral transmittance in a case where the first UV-IR blocking coat and the infrared absorption glass 305 are used and the spectral transmittance in a case where only the first UV-IR blocking coat is used are compared, the following can be seen. The spectral transmittance (total transmittance) in a case where both the first UV-IR blocking coat and the infrared absorption glass 305 are used indicates that infrared light is blocked by almost 0%. In contrast to this, in a case where only the first UV-IR blocking coat is used, a ripple starts near 940 nm that becomes a boundary between cut bands due to optical filter design, and transmission of infrared light of about 0.1% by a minute amount but in a wide wavelength range is achieved. That is, in a case where the infrared absorption glass 305 is absent, infrared light blocking capability lowers 10 times to 100 times in an infrared wavelength range of 750 nm to 1200 nm.

On the other hand, in a camera in which an imaging filter having such poor infrared light blocking capability is arranged, the following malfunction may happen.

As described above, the photosensor (photo-interrupter) 207a for detecting a position of the focus lens 205 of the imaging lens 200 emits near-infrared light of 850 nm with the infrared light emitting diode, and receives reflected light from a measurement object with the photo-transistor.

When this photosensor 207a is in an activation state, also including the exposure state of the camera 150, the photosensor 207a performs constant sensing, and the infrared light emitting diode in the sensor constantly emits light by a predetermined period. Here, in an environment of a dark place such as an environment in which an astronomical photograph is captured, for instance, high sensitivity such as ISO speed at a value of several tens of thousands, and exposure time corresponding to slow shutter speed of several tens of seconds are expected to be set as an image capture condition of the camera. In such a case, there is a possibility that light of the infrared light emitting diode of the photosensor described above slip through a gap between lens structures and pass through a lens surface to be incident on the image sensor 110, and that the light become ghost or flare light and be reflected together with a subject image. This phenomenon does not become an issue in the case of capturing an image of a landscape or a portrait in daytime, but in a case where a bright spot such as a star is in a dark background like an astronomical photograph, or in a case where an image of an object having pale light such as a diffused nebula is captured, the phenomenon significantly lowers quality of an image.

In the present embodiment, the photosensor 207a that is located in the imaging lens 200 is described as an example, but in the imaging lens 200, there is a zoom photosensor not illustrated. Furthermore, in the camera body 100, there is also a photosensor employed for detecting positions of the shutter 103 and the main mirror 104, and this may identically become a cause of occurrence of ghost and flare.

Then, as a countermeasure for this issue, it is conceivable to add one more surface of the second UV-IR blocking coat (second dielectric multilayer film) to the optical filter, and to form two surfaces of UV-IR blocking coats. A transmitted light amount is attenuated by multiplication of a transmittance of each medium, and thus, it becomes possible to obtain infrared light blocking capability in an identical degree to infrared light blocking capability of the optical filter of the normal camera employing the infrared absorption glass. Note that the second UV-IR blocking coat added is originally for the purpose of enhancing blocking of light in an infrared range, and thus, for the second UV-IR blocking, an IR blocking coat having only an infrared light blocking effect may be used, but here, by implication of an identical type of coat having an upper level of performance, a UV-IR blocking coat is used.

However, when two surfaces of UV-IR blocking coats including identical reflection cut spectral characteristics are provided, light from a subject is repeatedly reflected between these two surfaces of the blocking coats, and the light reaches the image sensor as ghost light. As a consequence, a new issue of impairment of quality of a captured image occurs.

Figure 6:
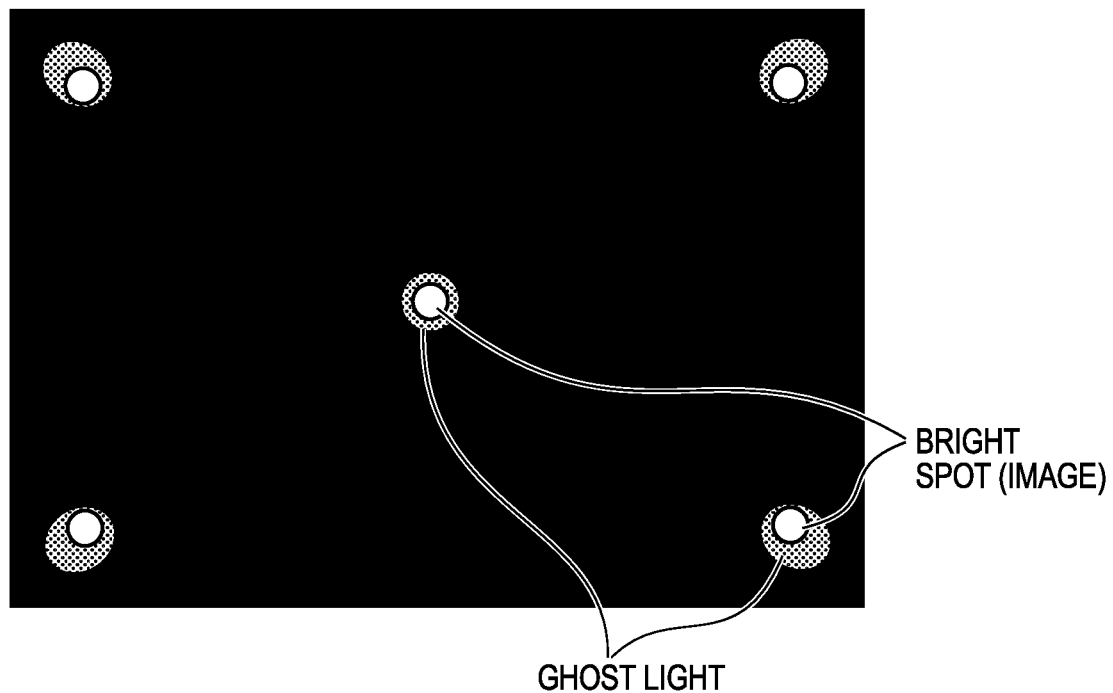
FIG. 6 is a schematic diagram illustrating ghost of a point image.

FIG. 6 is a schematic diagram illustrating ghost light in a case where visible white bright spots are arranged at the center and four corners of an imaging screen. With reference to FIG. 4, light from the bright spots of a subject passes through the imaging lens 200, and the second UV-IR blocking coat 300c of the optical filter 300 transmits the light, and the light is reflected by the first UV-IR blocking coat 300b, and is again reflected by the second UV-IR blocking coat 300c. Then, the first UV-IR blocking coat 300b transmits the light, and the light arrives at the image capture surface 110a of the image sensor 110.

In a case where images of the bright spots of the subject are formed in the image capture surface 110a, an image of an optical path of the light repeatedly reflected as described above is formed in the image capture surface 110a as an image in which an optical path length extends by δ=2×t/COS θ, where θ represents an angle of incident light from the subject with respect to a camera optical axis, and t represents a thickness of the crystal plate 300a that is a transparent substrate. That is, the image is formed in the image capture surface 110a as an image of out of focus. As illustrated in FIG. 6, this becomes ghost light spreading around the bright spots that are the subject images, or extending in an outer circumferential direction from the bright spots.

Figure 7A:
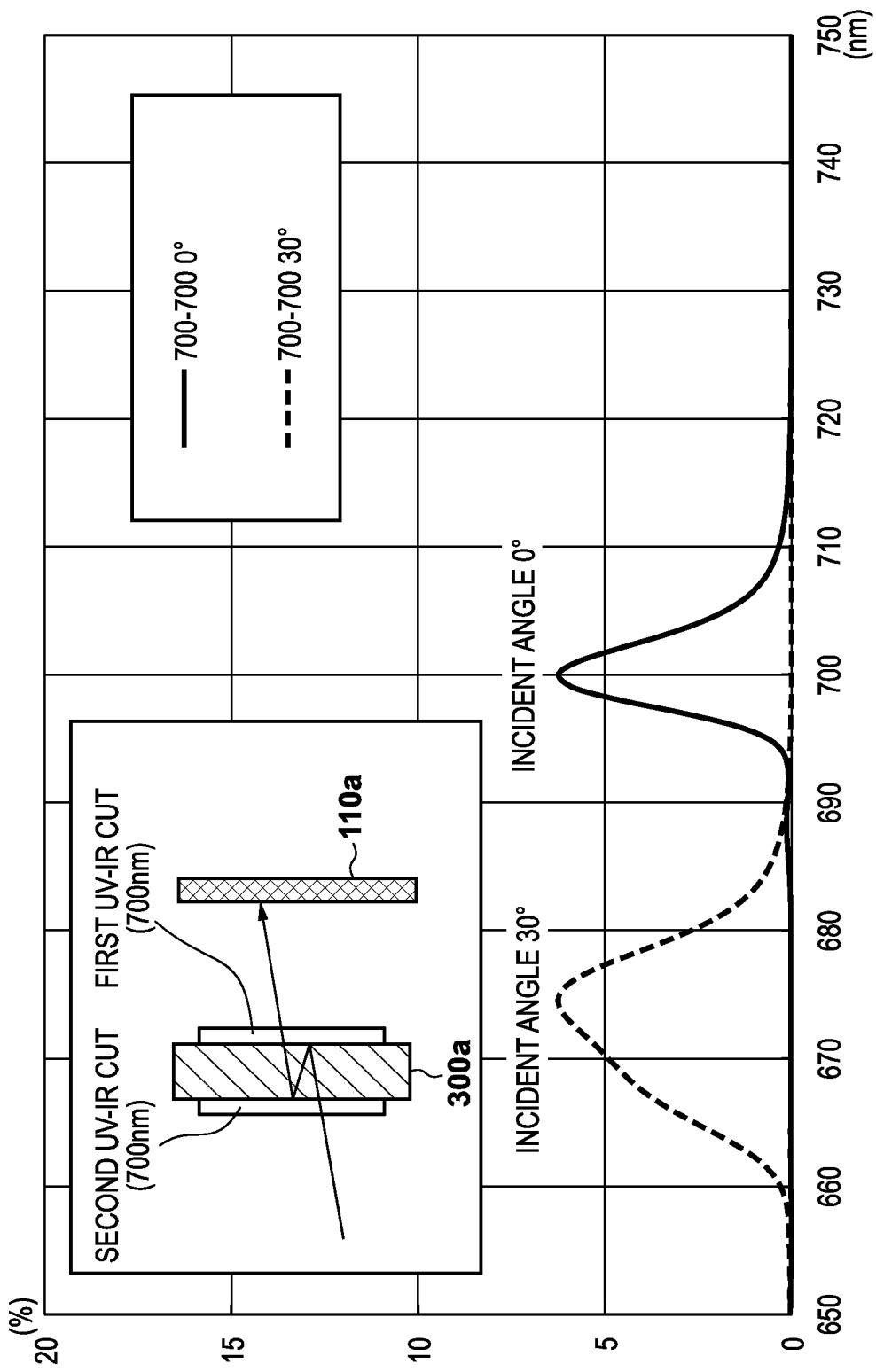
FIG. 7A is a figure showing spectral intensity of ghost light.

FIG. 7A is a graph showing a calculated spectral transmittance of ghost light of the optical filter 300 in which the first UV-IR blocking coat having a longer-wavelength side cut wavelength of 700 nm is vapor-deposited on the back surface (image capture surface 110a side) of the crystal plate 300a, and the second UV-IR blocking coat having a longer-wavelength side cut wavelength of 700 nm is identically vapor-deposited on the surface (imaging lens 200 side) of the crystal plate 300a.

The calculation is based upon a measured value of the spectral transmittance of the first UV-IR blocking coat having a longer-wavelength side cut wavelength of 700 nm as shown in FIG. 5. A concept of the calculation is as follows.

For instance, in a case where an incident angle of light having a wavelength of 700 nm is 0°, each of the first UV-IR blocking coat 300b and the second UV-IR blocking coat 300c has a transmittance of 50% and a reflectance of 50%. Thus, the second UV-IR blocking coat 300c transmits 50% of light of a bright spot that is a subject, and 50% of the light is reflected by the first UV-IR blocking coat 300b. Then, 50% of the light is again reflected by the second UV-IR blocking coat 300c, and the first UV-IR blocking coat 300b further transmits 50% of the light. Thus, an amount of light finally reaching the image capture surface 110a is 6.25% that is the fourth power of 50%. Similar calculation is also performed for other wavelengths.

Furthermore, in a so-called full size camera including an image capture surface of 24 mm×36 mm, light from a subject reaches the image capture surface 110a at an incident angle of 0° to approximately 30°. FIG. 8 is a graph of an angular dependency spectral transmittance of the first UV-IR blocking coat having a longer-wavelength side cut wavelength of 700 nm and a shorter-wavelength side cut wavelength of 410 nm, and the graph is obtained by measuring the spectral transmittance for each of light beam incident angles of 0°, 10°, 20°, and 30°. In this manner, normally, in a dielectric multilayer film such as a UV-IR blocking coat, an optical path length in a film thickness changes in accordance with an angle of incident light, and thus, as for light that is incident with an angle, a cut wavelength shifts to a shorter-wavelength side. Then, a spectral transmittance of ghost light is identically calculated also for an incident angle of 30°, based upon measurement data.

Only the cases of incident angles of 0° and 30° are shown in FIG. 7A, but actually, ghost light of out of focus that has wavelengths continuously changing from 660 nm to 710 nm and brightness of about 5% of an original image occurs near a bright spot that is a subject image, as illustrated in FIG. 6.

Figure 7B:
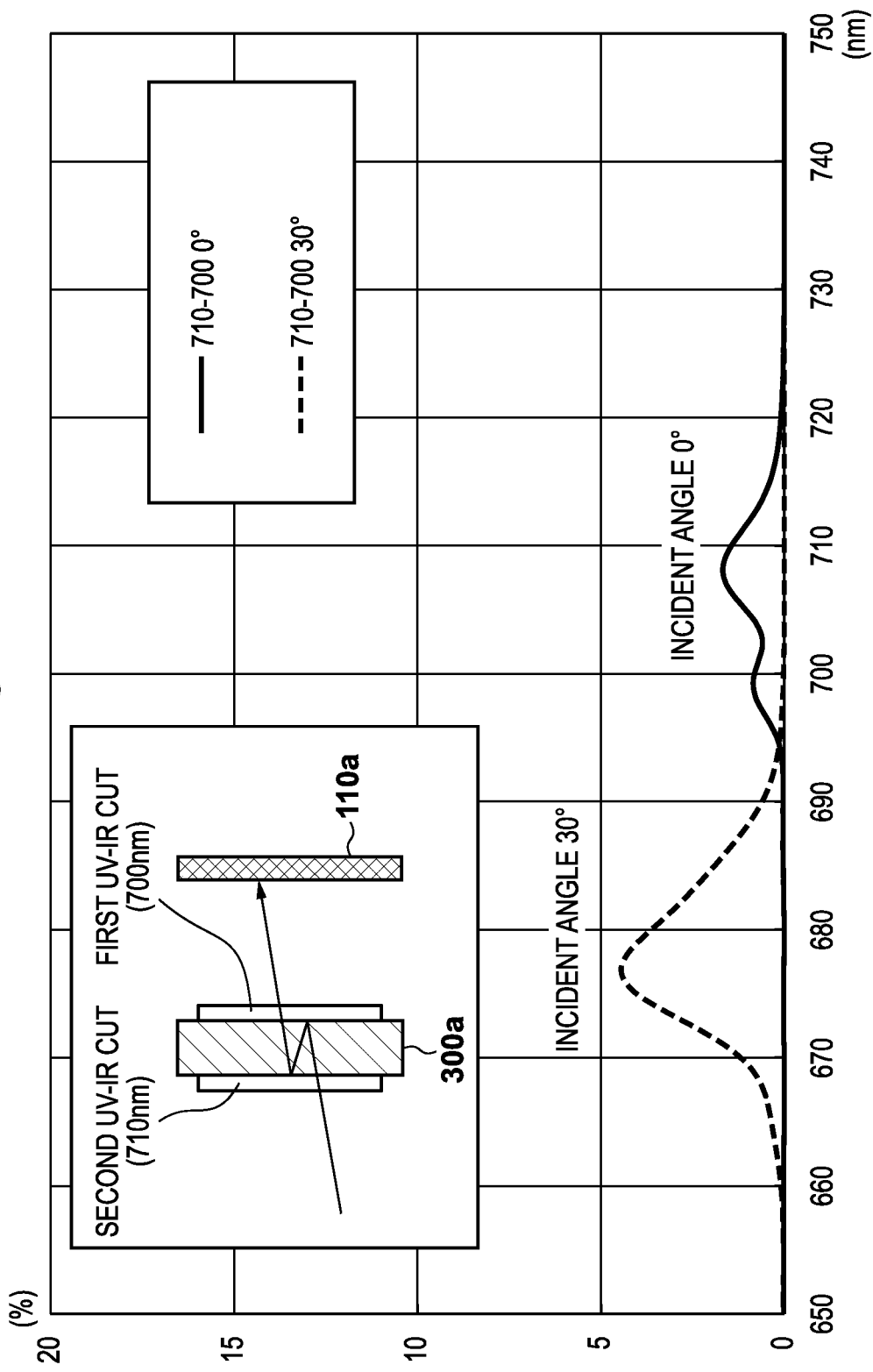
FIG. 7B is a figure showing spectral intensity of ghost light.
Figure 7C:
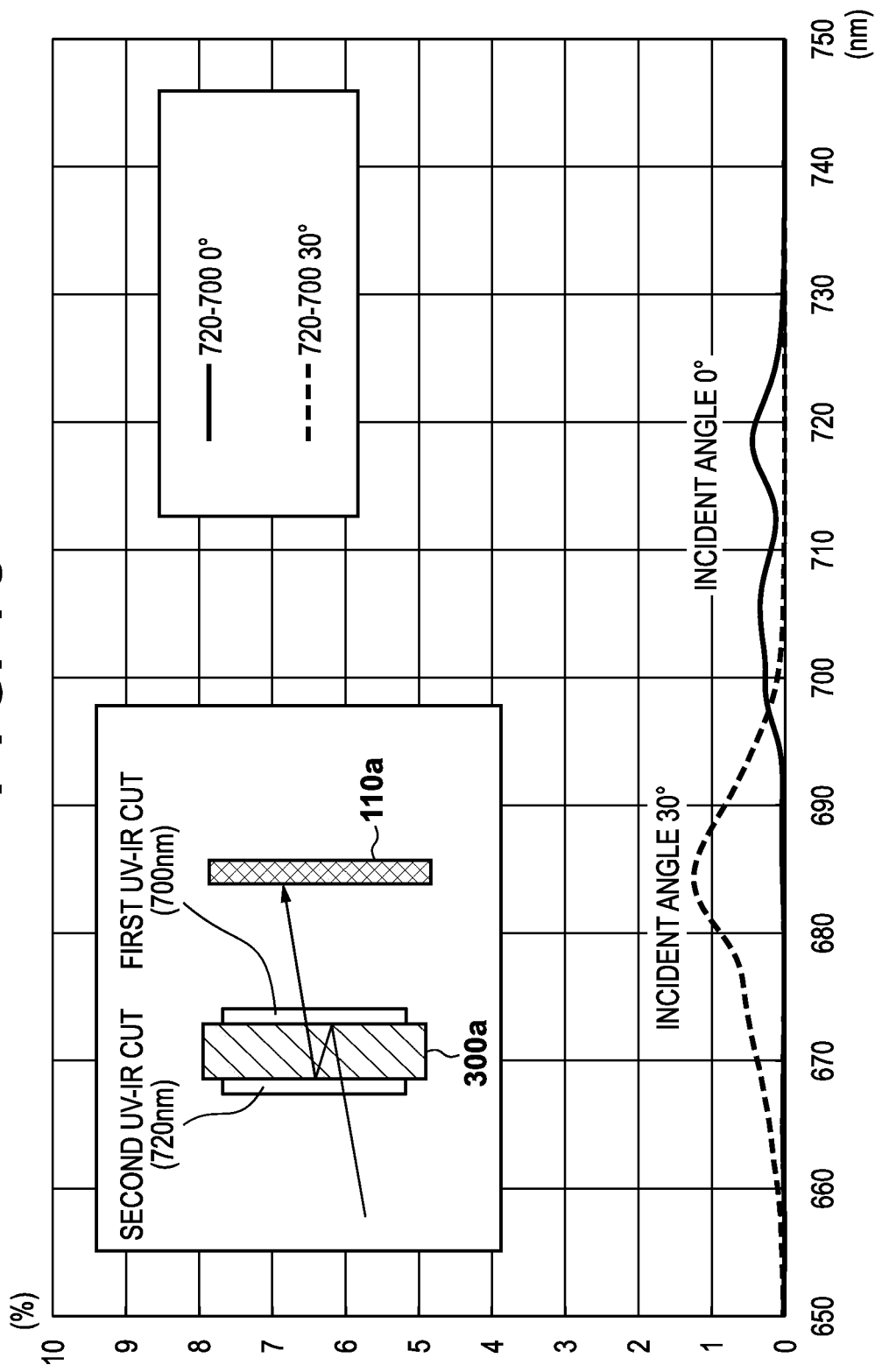
FIG. 7C is a figure showing spectral intensity of ghost light.
Figure 7D:
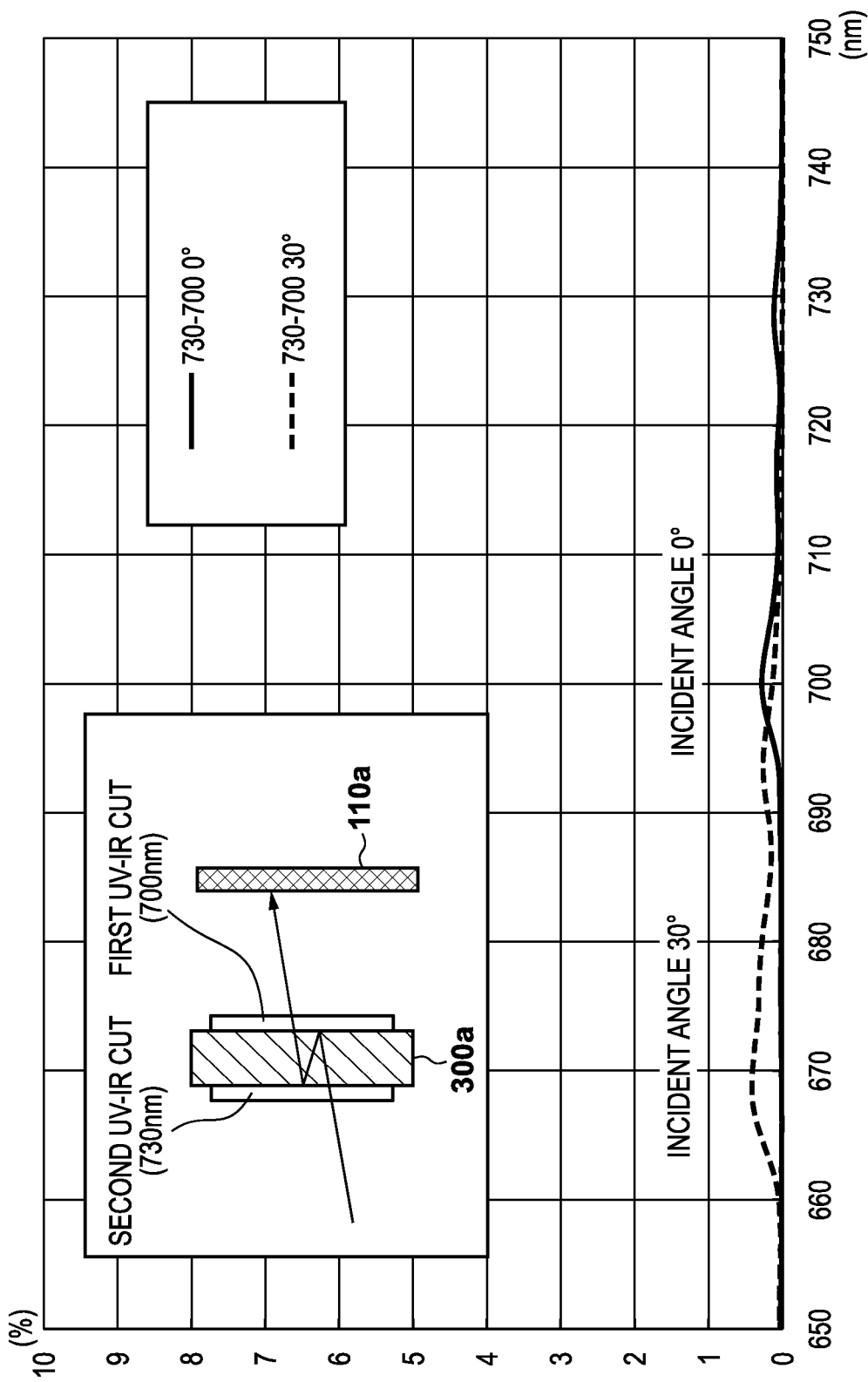
FIG. 7D is a figure showing spectral intensity of ghost light.

In contrast to this, FIG. 7B to FIG. 7D are figures obtained by calculation similar to the calculation described above in a case where while a longer-wavelength side cut wavelength of the first UV-IR blocking coat is 700 nm, a longer-wavelength side cut wavelength of the second UV-IR blocking coat are varied to be 710 nm, 720 nm, or 730 nm. Note that each piece of spectral data is created by offsetting only the cut wavelengths, in spectral measured values at a wavelength of 700 nm.

As can be seen in FIG. 7B, in a case where a longer-wavelength side cut wavelength of the second UV-IR blocking coat is 710 nm, ghost light of near 700 nm significantly lowers at an incident angle of 0°. On the other hand, ghost light of near 675 nm does not lower very much at an incident angle of 30°. Subsequently, as shown in FIG. 7C, in a case where a longer-wavelength side cut wavelength of the second UV-IR blocking coat is set to be 720 nm, ghost intensity lowers to a practical level, that is, intensity of 0.5% near the 700 nm at an incident angle of 0°, and intensity of above 1% near 675 nm at an incident angle of 30°. Further, as shown in FIG. 7D, when a longer-wavelength side cut wavelength of the second UV-IR blocking coat is set to be 730 nm, that is, a cut wavelength difference of 30 nm is made with respect to the first UV-IR blocking coat, the following is obtained. As compared with the case where both the coats have a cut wavelength of 700 nm, ghost intensity is not greater than 1/10, that is, not greater than 0.5% over all a red band of 660 to 710 nm, and a good reflection ghost level as in a general anti-reflection coat can be achieved.

On the other hand, this multiple reflection ghost phenomenon also occurs in a 415 nm range that is the shorter-wavelength side cut wavelength of the first UV-IR blocking coat. Thus, a shorter-wavelength side cut wavelength of the second UV-IR blocking coat is set to be 400 nm that is a wavelength shifted toward a shorter-wavelength side by 15 nm from a cut wavelength of 415 nm of the first UV-IR blocking coat. While a difference in a longer-wavelength side cut wavelength of near 700 nm is set to be 30 nm, a difference in a shorter-wavelength side cut wavelength of near 400 nm is set to be 15 nm that is half the difference in the longer-wavelength side cut wavelength of near 700 nm.

In the ghost light occurrence phenomenon due to the multiple reflection described above, when original blocking of light having a particular wavelength is completely, digitally, and sharply performed and cut wavelengths of two surfaces of blocking coats are different even by 1 nm, ghost light does not occur. However, realistically, due to film design and also from the viewpoint of film formation, there is a width in a cut wavelength that can be blocked, and a sag in a cut wavelength is not avoidable.

In the case of the first UV-IR blocking coat generally including about 50 layers as shown in FIG. 5, for instance, near 700 nm, a wavelength width of about 20 nm is required for attenuating a stable transmittance of 98% to 5%, and a wavelength width of about 40 nm is required for further attenuation to a transmittance of 1%. This sag can be somewhat ameliorated by further increasing the number of the layers of the dielectric film, but is a phenomenon that basically remains. On the other hand, near 400 nm, wavelength blocking becomes sharp as compared with wavelength blocking near 700 nm, and only a wavelength width of about 10 nm is required for attenuating a stable transmittance of 94% to 5%, and thus, about half of the cut wavelength width required near 700 nm is required. From this, a shorter-wavelength side cut wavelength of the second UV-IR blocking coat is set to be 400 nm.

As described above, it is difficult by using only one surface of the UV-IR blocking coat to achieve a low transmittance at a high level in a wideband of, for instance, 700 nm to 1200 nm, to block ghost and flare due to leakage of light from the infrared light emitting diode of the photosensor.

From the above, to efficiently capture an image with a certain wavelength band by removing infrared absorption glass, it is desirable to employ a filter configuration in which a blocking coat that is a dielectric film reflecting and blocking light having a particular wavelength is arranged on each of two different surfaces of optical filter base materials. Then, a first blocking coat (first dielectric multilayer film) having a cut wavelength corresponding to a wavelength that is originally intended to be blocked is formed on one surface of an optical filter. Then, a second blocking coat (second dielectric multilayer film) is formed on further another surface of the optical filter, and in the second blocking coat, a cut wavelength in a wavelength range side that is intended to be blocked is different from the cut wavelength of the first blocking coat by a predetermined wavelength difference.

Note that even when the surfaces on which the first UV-IR blocking coat 300*b* and the second UV-IR blocking coat 300*c* are arranged are swapped, only the order of multiplication of a spectral transmittance and a spectral reflectance changes, and thus, spectral intensity of ghost light finally incident on the image capture surface 110*a* becomes identical.

Furthermore, in the present embodiment, as described above, the first UV-IR blocking coat 300*b* is a dielectric multilayer film coat having spectral characteristics of a longer-wavelength side cut wavelength of 700 nm and a shorter-wavelength side cut wavelength of 415 nm. Furthermore, the second UV-IR blocking coat 300*c* has spectral characteristics of a longer-wavelength side cut wavelength of 730 nm and a shorter-wavelength side cut wavelength of 400 nm. However, as a matter of course, it is also possible to swap the respective cut wavelengths of the blocking coats.

For instance, a longer-wavelength side cut wavelength of the first UV-IR blocking coat 300*b* is set to be 700 nm, and a shorter-wavelength side cut wavelength of the first UV-IR blocking coat 300*b* is set to be 400 nm. Then, a longer-wavelength side cut wavelength of the second UV-IR blocking coat 300*c* is set to be 730 nm, and a shorter-wavelength side cut wavelength of the second UV-IR blocking coat 300*c* is set to be 415 nm. In this manner, an area of a transmission band is balanced between the coats, and this is preferred in terms of film design of the two blocking coats.

Second Embodiment

Figure 9A:
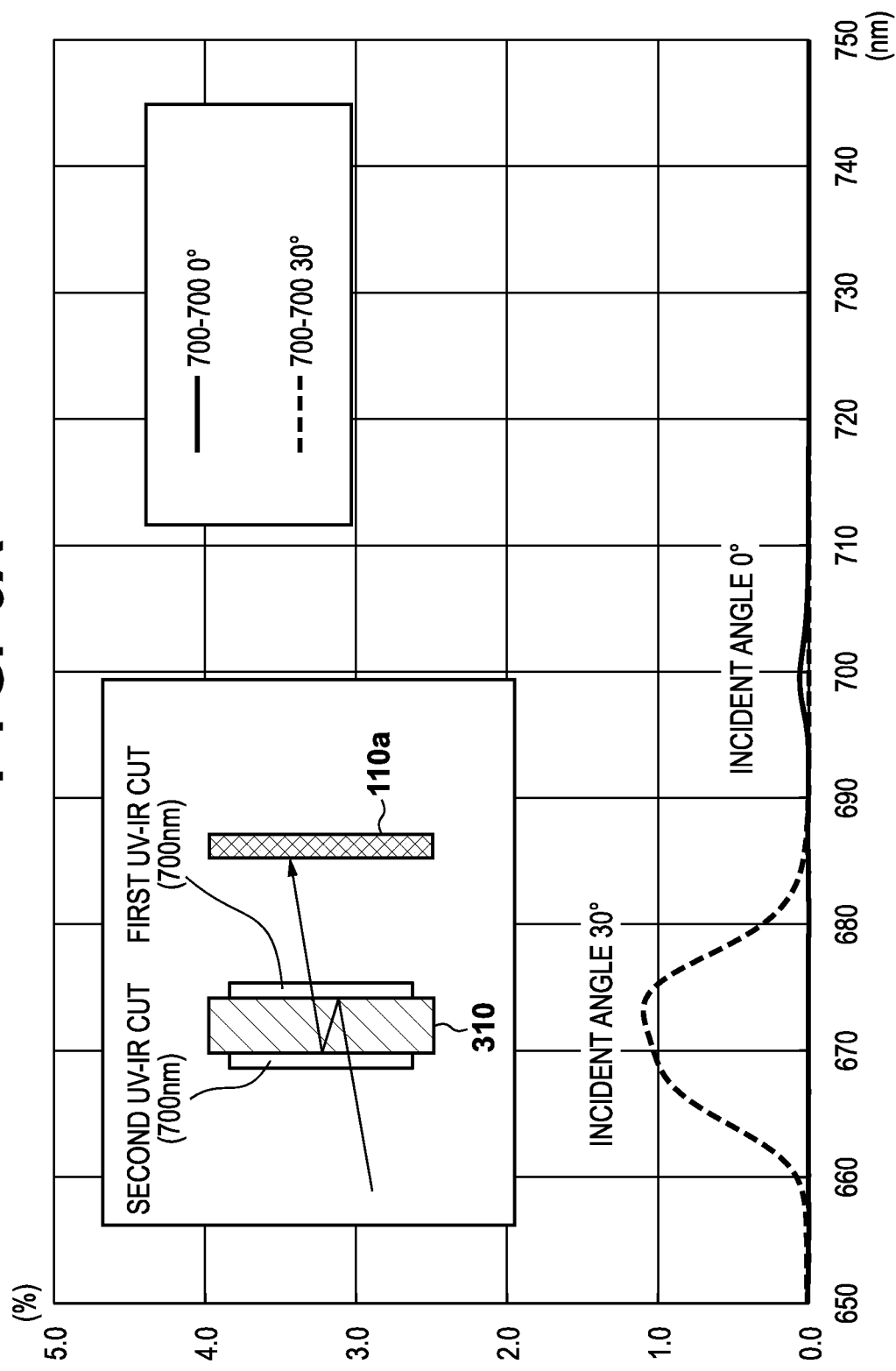
FIG. 9A is a figure showing spectral intensity of ghost light.
Figure 10:
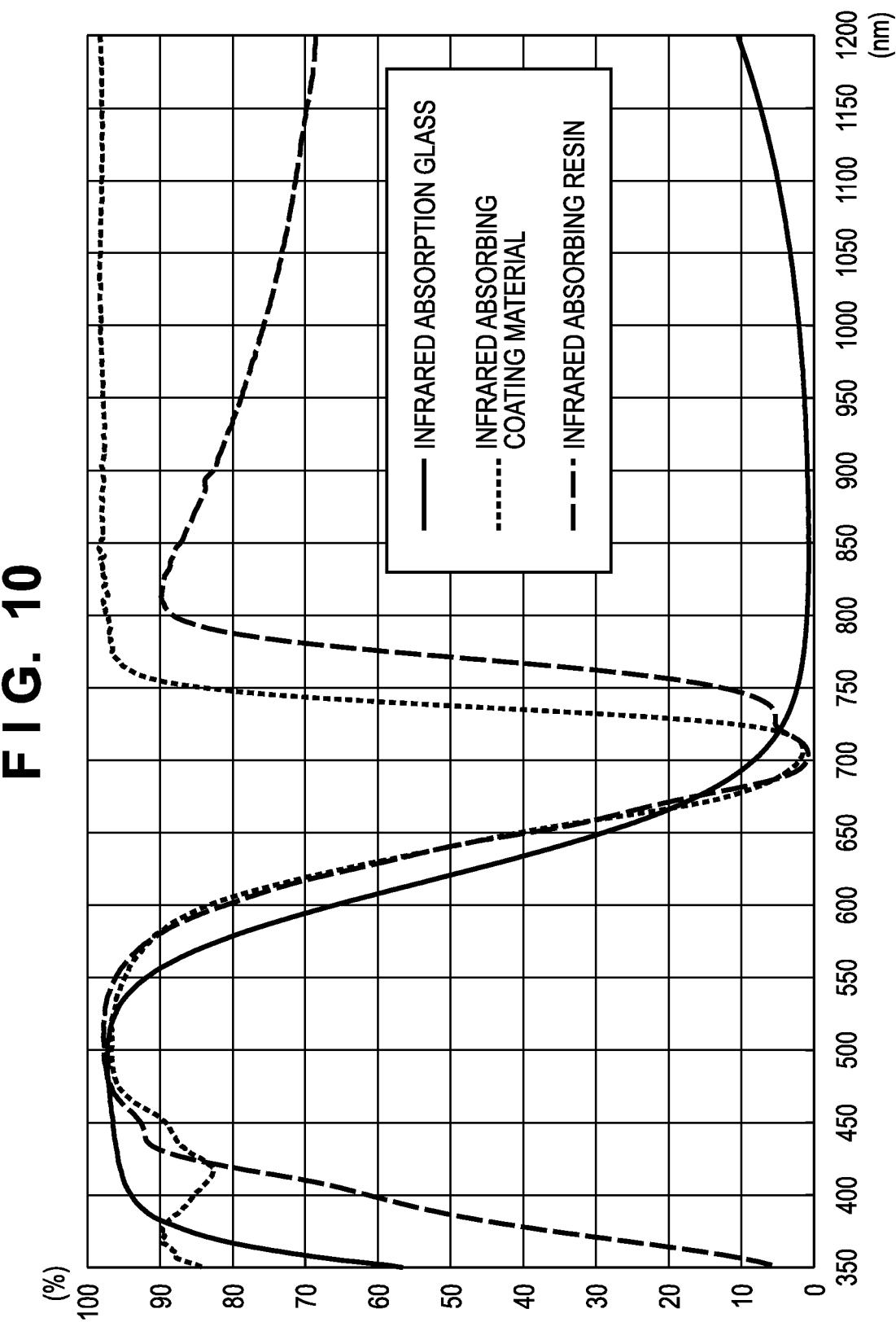
FIG. 10 is a figure showing a spectral transmittance of an infrared absorbing material and an infrared absorbing coating material.

FIG. 9A is a figure illustrating a configuration of an optical filter according to a second embodiment. An infrared absorbing resin (infrared absorbing material) 310 is constituted of a resin containing infrared absorbing pigment having an infrared absorption effect, and FIG. 10 shows an example of spectral transmittance characteristics of the infrared absorbing resin 310. As can be seen in FIG. 10, the infrared absorbing resin 310 has a strong absorption band (absorption band in which a transmittance becomes minimum) at a wavelength of near 700 nm, and has week absorption/blocking capability at other wavelengths, in particular in an infrared wavelength range. Thus, to obtain a low transmittance at a high level in a wideband of 700 nm to 1200 nm as in the case where the infrared absorption glass 305 is employed, two surfaces of IR blocking coats are required to be employed as with the first embodiment.

FIG. 9A is a graph showing a calculated spectral transmittance of ghost light of an optical filter in which a first UV-IR blocking coat having a longer-wavelength side cut wavelength of 700 nm is vapor-deposited on a back surface (image capture surface 110*a* side) of the infrared absorbing resin 310, and a second UV-IR blocking coat having a longer-wavelength side cut wavelength of identically 700 nm is vapor-deposited on a surface (imaging lens 200 side) of the infrared absorbing resin 310. As described above, the infrared absorbing resin 310 has a maximum absorption wavelength of 700 nm, and thus, at an incident angle of 0°, ghost light is blocked by almost 0%. However, at an incident angle of 30°, as can be seen in FIG. 8, due to a shift of the cut wavelength, a wavelength at which a transmittance of 50% is achieved shifts from 700 nm to 670 nm, and a transmittance of the infrared absorbing resin 310 also increases. Thus, light of near 670 nm remains as ghost light by intensity of about 1%. Here, only the cases of 0° and 30° are shown, but as with the first embodiment, also at an intermediate angle, ghost light having continuously changing wavelengths occurs.

Then, as in the first embodiment, the first UV-IR blocking coat having a longer-wavelength side cut wavelength of 700 nm and a shorter-wavelength side cut wavelength of 415 nm is vapor-deposited on the back surface (image capture surface 110*a* side) of the infrared absorbing resin 310. Then, the second UV-IR blocking coat having a longer-wavelength side cut wavelength of 730 nm and a shorter-wavelength side cut wavelength of 400 nm is vapor-deposited on the surface (imaging lens 200 side). In this manner, as shown in FIG. 9B, intensity of ghost light can be lowered to be 0.1% or less also near 670 nm.

Third Embodiment

FIG. 11A is a figure illustrating an optical filter composed of a two-plate configuration including a crystal plate 301 that is an optical low-pass filter, and a white glass plate 302 that is a transparent substrate. A dust-proof coat 321 composed of a fluorine coat is formed on a surface (imaging lens 200 side) of the crystal plate 301, and a second UV-IR blocking coat is vapor-deposited on a back surface (image capture surface 110*a* side) of the crystal plate 301. Furthermore, a first UV-IR blocking coat is vapor-deposited on a surface (imaging lens 200 side) of the white glass plate 302, and an infrared absorbing coating material 320 is applied to a back surface (image capture surface 110a side) of the white glass plate 302. The infrared absorbing coating material can be formed as a thin film on the substrate by, for instance, spin coating.

FIG. 10 shows an example of spectral transmittance characteristics in that case. A maximum absorption wavelength of this infrared absorbing coating material 320 is 700 nm that is identical to the maximum absorption wavelength of the infrared absorbing resin 310, and there is almost no absorption in a longer-wavelength side than 700 nm. Thus, again, when a combination of two surfaces of IR blocking coats of dielectric multilayer films is not employed, a sufficient blocking effect of an infrared wavelength cannot be obtained.

Figure 11B:
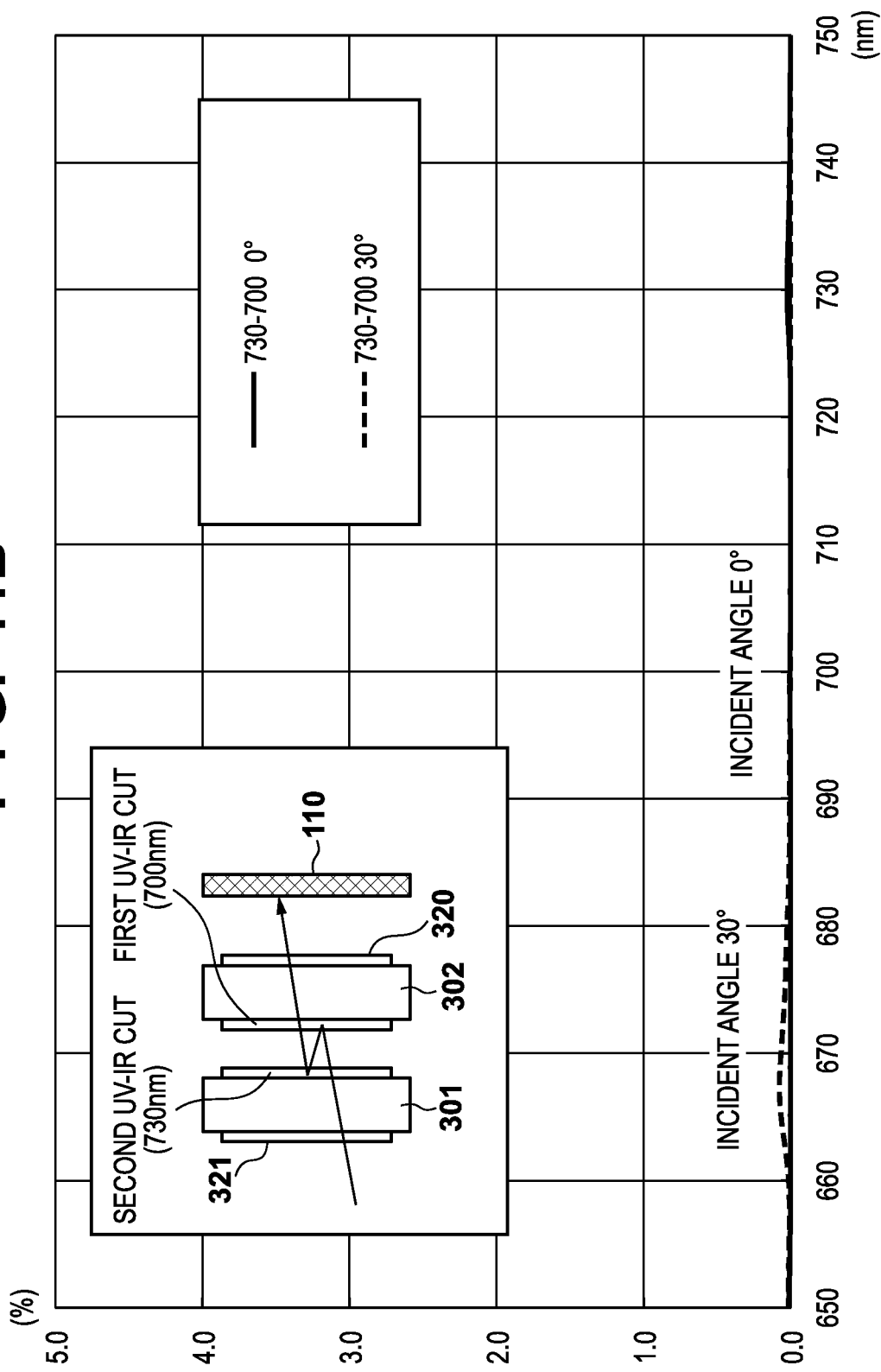
FIG. 11B is a figure showing spectral intensity of ghost light.

In the above-described two-filter configuration of FIG. 11A, as with the case of the infrared absorbing resin 310, a longer-wavelength side cut wavelength of the first UV-IR blocking coat is set to be 700 nm, and a longer-wavelength side cut wavelength of the second UV-IR blocking coat is identically set to be 700 nm. In this case, again, at an incident angle of 30°, ghost light remains at intensity of about 1%. Then, in FIG. 11B, a longer-wavelength side cut wavelength of the first UV-IR blocking coat is set to be 700 nm, and a longer-wavelength side cut wavelength of the second UV-IR blocking coat is set to be 730 nm. In this case, as with the case where the infrared absorbing resin 310 of the second embodiment is used, ghost light can almost be eliminated.

Note that in the above-described embodiments, specific numeric values such as 400 nm, 415 nm, 700 nm, 730 nm, 15 nm, and 30 nm are described for a cut wavelength and a cut wavelength difference, but these values are not necessarily accurately the values described, and may be values generally near the wavelengths described, such as approximately 400 nm, approximately 415 nm, approximately 700 nm, approximately 730 nm, approximately 15 nm, and approximately 30 nm.

As described above, according to the above-described embodiments, it is possible to effectively prevent infrared light leaking from a position detection sensor from reaching an image sensor by employing a filter in which films having cut wavelengths different from each other by a predetermined amount are formed on two surfaces of an optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-144955, filed Sep. 6, 2021, which is hereby incorporated by reference herein in its entirety.

What is claimed is:

1. An optical filter arrangeable in an optical path between an imaging lens and an image sensor, the optical filter comprising at least one optical member that transmits light, wherein a first optical film that reflects at least one of light in a longer wavelength band than a first wavelength and light in a shorter wavelength band than a second wavelength shorter than the first wavelength is formed on a first surface of the at least one optical member, and a second optical film that reflects at least one of light in a longer wavelength band than a third wavelength and light in a shorter wavelength band than a fourth wavelength shorter than the third wavelength is formed on a second surface of the at least one optical member, the second surface being different from the first surface, and the first wavelength and the third wavelength are different from each other by a first predetermined amount, and the second wavelength and the fourth wavelength are different from each other by a second predetermined amount, wherein the at least one optical member is composed of two optical members including one crystal plate and one white glass plate.

2. The optical filter according to claim 1, wherein the first wavelength is approximately 700 nm, and the third wavelength is approximately 730 nm.

3. The optical filter according to claim 2, wherein the second wavelength is approximately 415 nm, and the fourth wavelength is approximately 400 nm.

4. The optical filter according to claim 2, wherein the second wavelength is approximately 400 nm, and the fourth wavelength is approximately 415 nm.

5. The optical filter according to claim 1, wherein the first optical film and the second optical film are dielectric multilayer films.

6. The optical filter according to claim 1, wherein the at least one optical member is one optical member composed of an infrared absorbing material having a minimum transmittance of light at a wavelength of near 700 nm.

7. The optical filter according to claim 1, wherein a film of an infrared absorbing coating material is formed on one surface of the white glass plate.

8. The optical filter according to claim 1, wherein a film of a dust-proof coat composed of a fluorine coat is formed on one surface of the crystal plate.

9. An image capturing apparatus comprising the optical filter according to claim 1 arranged in an optical path between an imaging lens and an image sensor.

* * * * *